W. GOBLET.
SPEED INDICATOR FOR BOATS.
APPLICATION FILED JUNE 4, 1910.
1,007,280.
Patented Oct. 31, 1911.
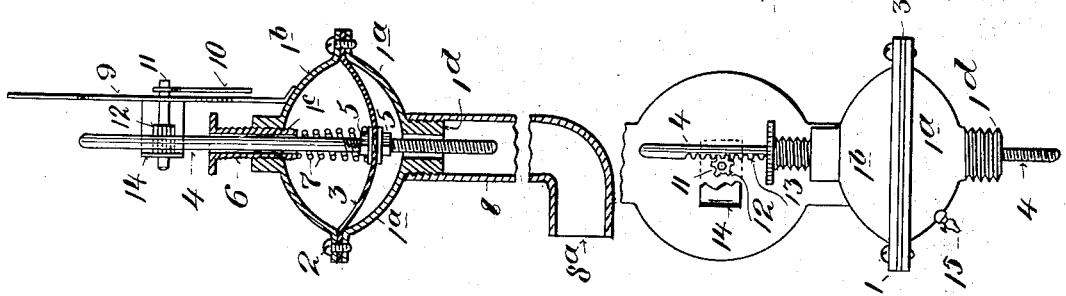
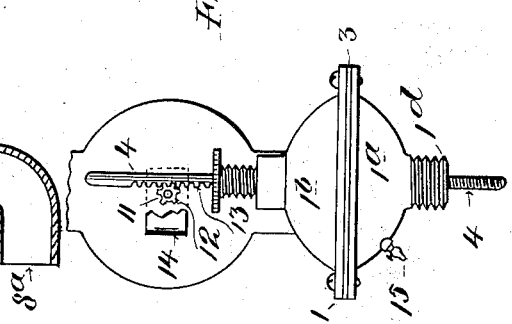
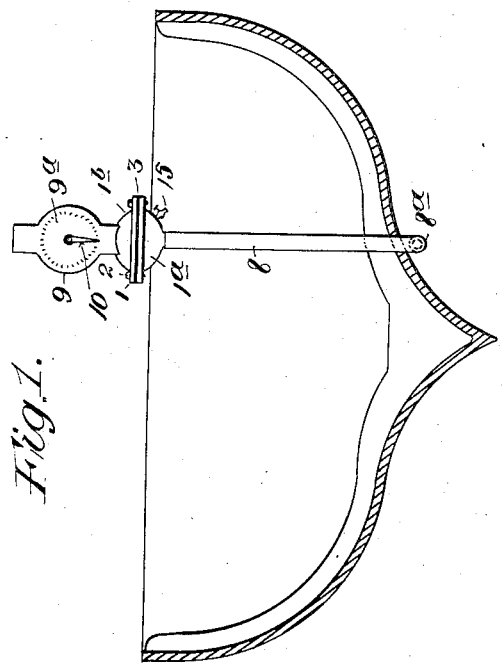
Witnesses:
Inventor
William Goblet.
By his Attorney

UNITED STATES PATENT OFFICE.

WILLIAM GOBLET, OF ROSEBANK, NEW YORK.

SPEED-INDICATOR FOR BOATS.

1,007,280.     Specification of Letters Patent.     Patented Oct. 31, 1911.

Application filed June 4, 1910. Serial No. 564,920.

*To all whom it may concern:*

Be it known that I, WILLIAM GOBLET, a citizen of the United States, and resident of Rosebank, in the county of Richmond and State of New York, have invented certain new and useful Improvements in Speed-Indicators for Boats, of which the following is a specification.

The object of my invention is to provide means to indicate the speed of boats of all kinds, and particularly boats driven by mechanical power, such as motor boats, steamships and the like.

In carrying out my invention I provide an indicating device with means to operate the same controlled by the pressure of the water in which the boat floats due to the propulsion of the boat through such water.

In the specific embodiment of my invention illustrated in the accompanying drawings, I provide a casing containing a movable member connected with an index or pointer, and one side of said member, is in communication, by a pipe extending through the boat, with the water beneath in such position that as the boat travels forwardly the water flowing into the pipe will create a pressure upon the movable member to operate the index in accordance with the speed of the boat.

Reference is to be had to the accompanying drawings forming part hereof, wherein, Figure 1 is a cross section of a boat equipped with my improvement; Fig. 2 is a side elevation of my improved speedmeter partly broken away, and Fig. 3 is a vertical section thereof at right angles to Fig. 2.

The numeral 1 indicates a suitable casing shown comprising a lower section $1^a$ and an upper section $1^b$ secured together by screws 2 passing through the flanges of said sections, and within said casing is a movable member, shown in the form of a flexible diaphragm 3, shown secured between the flanges of said section.

At 4 is a rod shown passing freely through casing 1 and secured to diaphragm 3 by nuts 5 screwed on said rod clamping the diaphragm air and water tight, so that said rod will rise and fall with the diaphragm. Rod 4 is shown passing through the adjustable bushing 6 screwed into the threaded upper opening $1^c$ of casing 1 and preferably with such freedom as to permit the free passage of air into and from the upper chamber of the casing above the diaphragm.

At 7 is a spring shown coiled around rod 4 within the upper chamber of the casing and bearing at one end against bushing 6 and at the other end against one nut 5 tending normally to keep the diaphragm and rod 4 depressed. By rotating bushing 6 the effective tension of spring 7 may be varied as required for regulation. Rod 4 is shown passing freely through the lower apertured hub $1^d$ of section $1^a$ of the casing, and said hub is shown connected with pipe 8 that leads into the water adjacent the boat.

At 9 is an indicator of any suitable construction. In the example illustrated I have shown a dial $9^a$ having suitable graduations to indicate the speed, such as figures to represent miles per hour, and at 10 is an index or pointer carried by shaft 11 provided with a pinion 12 in mesh with rack 13 provided on rod 4, a suitable bracket 14 serving as a bearing for shaft 11, which is also shown supported to rotate in the front plate of the indicator 9, the latter being shown supported upon casing section $1^b$. It will be understood however, that the indicator or index may be of any suitable or well known construction customary for indicating speed, distances, volume and the like.

The indicator may be secured upon any desired part of the boat or vessel, and pipe 8 being connected tightly with hub $1^d$ is carried to the exterior of the boat, as by passing through the bottom thereof, and the lower end of said pipe is directed forwardly toward the bow of the boat, as at $8^a$, so as to receive pressure of the water when the boat travels forwardly. Assuming that the parts are in the normal position shown in Fig. 3, indicating zero, and that the boat travels forwardly, the pressure of the water through pipe 8 will be in proportion to the speed of the boat, and such water pressure, either directly upon the diaphragm, or against air interposed in pipe 8 and in the chamber beneath the diaphragm, will cause the diaphragm to bulge upwardly, thereby raising rod 4 and by means of the gearing causing index or pointer 10 to rotate in front of dial $9^a$ in accordance with the pressure beneath the diaphragm, which will be according to the speed of the boat. Air in the chamber above the diaphragm is permitted to escape past rod 4 and to return through the same course as required to maintain the proper air balance of the diaphragm. The casing section $1^a$ may be provided with a suitable cock or stopper 15 to equalize the pressure within the lower chamber of the casing when required.

While I have described my improvements as for use in connection with indicating the speed of boats and the like, the same is also applicable to measuring the depth of fluid in tanks, barrels and the like, or the amount of fluid added to such tank or the like. In such case when the pipe connected with the device is lowered into the fluid in the tank, barrel or the like, the pressure of the fluid in pipe 8 operating against the air therein will cause the upward bulging of the diaphragm and will indicate on the dial or indicator, which is suitably adapted for the purpose, the depth of fluid. Again, with the device fitted to a tank, barrel or the like, the amount of fluid poured into the tank or barrel will be measured in accordance with the pressure thereby created in pipe 8 by the inflow of such fluid into the tank. Cock 15 may be opened at any time to equalize pressure in the chamber beneath the diaphragm, and then closed before the fluid is charged into the tank.

Changes may be made in the details of construction set forth, within the scope of the appended claim, without departing from the spirit thereof.

Having now described my invention what I claim is:

In a speed indicator for boats, the combination of a casing comprising upper and lower concavo-convexed members secured together at their peripheries and each said member having an apertured hub, a pressure supply pipe, the lower hub being screw-threaded into the pressure supply pipe, a diaphragm secured between said upper and lower members of the casing, said diaphragm being apertured in alinement with the apertures of the upper and lower hubs, a rod having a rack thereon passing through the aperture of said diaphragm and clamped thereto, a helical spring surrounding said rod and exerting a pressure upon the diaphragm, a bushing screw-threaded into the aperture of the upper hub and surrounding said rod and adapted to increase or diminish the effective pressure of the spring upon the diaphragm, an indicator plate having a dial thereon secured directly to the casing and having a laterally extending bracket, a shaft carried by the bracket, said shaft carrying an index adapted to coact with the indicator plate for indicating the pressure exerted upon the diaphragm, said shaft carrying a pinion in coöperative relation with the rack whereby said pinion is rotated for actuating the index.

Signed at New York city, in the county of New York, and State of New York, this 3rd day of June A. D. 1910.

WILLIAM GOBLET.

Witnesses:
WILLIAM A. W. GRIER,
T. F. BOURNE.